United States Patent

Tachibana et al.

Patent Number: 6,075,558
Date of Patent: Jun. 13, 2000

[54] AUTO-FOCUS DEVICE

[75] Inventors: Shunsaku Tachibana; Kenji Okabe; Seiji Shimokawa, all of Kawasaki, Japan

[73] Assignee: Mitutoyo Corporation, Kawasaki, Japan

[21] Appl. No.: 08/856,394

[22] Filed: May 14, 1997

[30] Foreign Application Priority Data

May 20, 1996 [JP] Japan .................................. 8-124582

[51] Int. Cl.⁷ ................................................. H04N 7/18
[52] U.S. Cl. ........................ 348/80; 350/510; 350/516; 350/331; 396/89; 250/311
[58] Field of Search ............................ 348/80; 250/201, 250/311

[56] References Cited

U.S. PATENT DOCUMENTS

| 4,561,731 | 12/1985 | Kley ........................................ 350/510 |
| 4,918,953 | 4/1990 | Newman .................................. 70/131 |
| 4,935,612 | 6/1990 | Bierleutgeb . | |
| 4,945,220 | 7/1990 | Mallory et al. . | |
| 5,056,177 | 10/1991 | Nast . | |
| 5,081,354 | 1/1992 | Ohhashi et al. ........................ 250/311 |
| 5,577,950 | 11/1996 | Smith et al. ............................. 451/42 |
| 5,604,344 | 2/1997 | Finarov .................................. 250/201 |

FOREIGN PATENT DOCUMENTS

| 2 198 607 | 6/1988 | United Kingdom . |
| 2 207 828 | 2/1989 | United Kingdom . |

*Primary Examiner*—Howard Britton
*Assistant Examiner*—Shawn S. An
*Attorney, Agent, or Firm*—Oliff & Berridge, PLC

[57] ABSTRACT

In an auto-focus apparatus having an object lens 14 which condenses light on an object surface to be measured, a CCD camera 24 observing the object's image based on emitting light from the object lens 14, and an actuator 15 which displaces the object lens 14 along the optical axis based on the contrast of the object image obtained with the CCD camera 24, the auto-focus apparatus includes an illuminator 25, a projection lens 21 and a liquid crystal panel 22 on which a designated pattern is displayed and further includes a pattern projection means 20 which projects the designated pattern on the object surface to be measured.

10 Claims, 10 Drawing Sheets

22A

EDGE OF THE OBJECT
TO BE MEASURED

F I G. 11
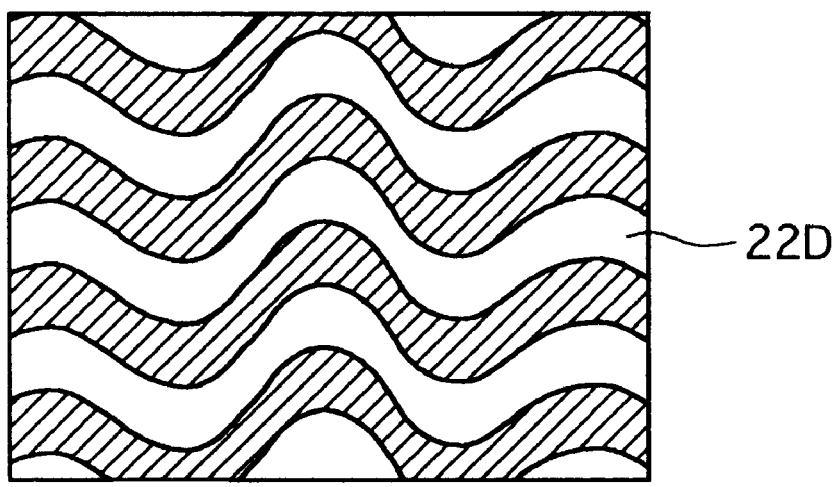
F I G. 12
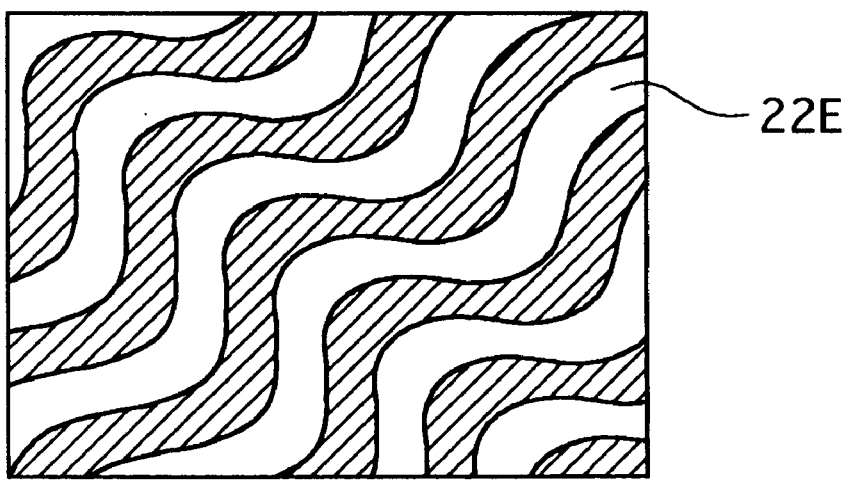

F I G. 13(A)
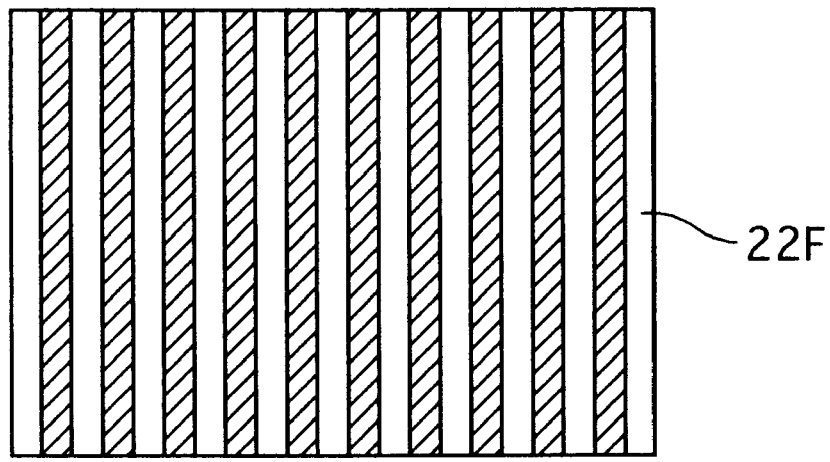
F I G. 13(B)
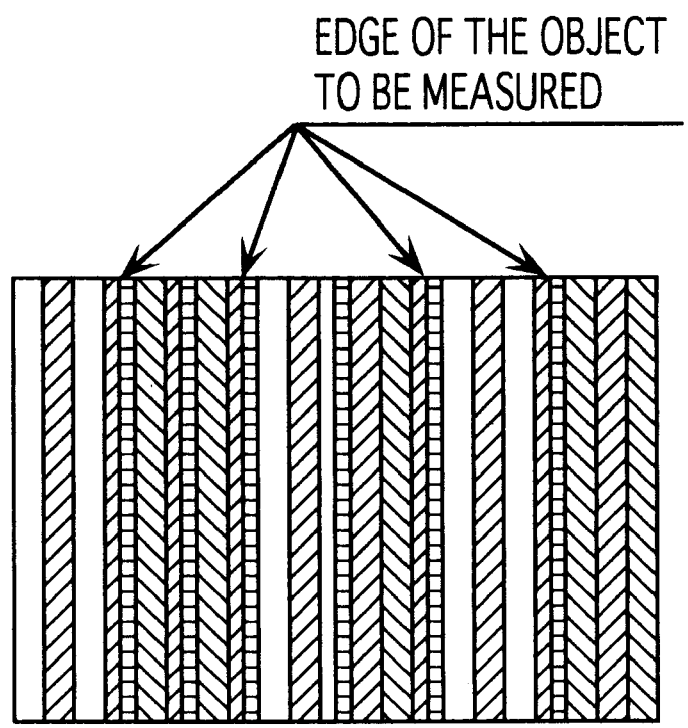

AUTO-FOCUS DEVICE

BACKGROUND OF THE INVENTION

1. Field of the Invention

The present invention relates to an auto-focus apparatus which is improved to make an object lens movable based on a contrast of the object image so that the object lens can always focus on an object surface to be measured. The present invention is applicable to an optical measurement equipment such as an image measuring instrument, a microscope which carries out measurement on sizes and shapes of the object to be measured with observing an image of the object with an optical observation system.

2. Description of the Related Art

As the types of auto-focus apparatus provided on an optical measuring instrument such as an image measuring instrument or a microscope, there has been known a contrast method type to obtain focus based on the contrast of the image of an object surface to be measured. The image is first taken by a CCD camera. Or a laser focus method type to obtain focus based on the reflected light from the object surface to be measured using a laser.

But the above described contrast method or the laser method has following difficulties.

It is difficult for the former contrast method to bring correct focus on an essentially low contrast surface such as a mirror-finished surface or a glass surface.

In the latter laser focus method, it is possible to bring focus on the low contrast surfaces just described above but only on the spot radiated with the laser (most of the spots are on central portions). Moreover, the instrument itself is very expensive.

The object of the present invention is to provide an auto-focus apparatus which resolves the difficulties of conventional contrast method type or laser focus method type, enabling to focus on objects to be measured of all sort of materials, and on any optional spots within an observed image of the object to be measured.

SUMMARY OF THE INVENTION

An auto-focus apparatus of the present invention additionally provides, a pattern projection means which projects a designated pattern on the surface of object to be measured, to the auto-focus apparatus having an object lens which focuses light on an object surface to be measured, an optical observation system for observing an image of the object to be measured based on emitted light through the object lens, and a drive mechanism which displaces the object lens along the optical axis based on the contrast of the object image obtained with the optical observation system.

Using the above structure, a designated pattern can be projected on the surface of the object to be measured and based on the contrast of the pattern, the object lens can be displaced along the optical axis to focus on the surface of the object to be measured, even on an originally low contrast material such as a mirror-finished surface or a glass surface. As the method of the present invention belongs to a contrast method, the difficulty in the laser focus method can also be resolved.

In the structure above described, it is preferable that the pattern projection means includes an illuminator, a projection lens, and a pattern projection panel which is inserted between the illuminator and the projection lens and has at least one designated pattern.

In measuring an object of low contrast material, the measurement is carried out under the condition that the pattern on the pattern projection panel is projected on the surface of the object to be measured through the projection lens while measuring an object of high contrast material, the pattern projection panel is removed away from the light path by withdrawing the plate so that the instrument can be used in the same way as in the conventional contrast method. And a pattern projection panel can be replaced to a plate having a more appropriate pattern for the shape and quality of the surface of the object to be measured.

It is more preferable to include an adjusting mechanism to adjust the distance and inclination of the pattern projection panel with reference to the projection lens for pattern projection means in addition to the illuminator, the projection lens and the pattern projection panel.

The distance and the inclination of the pattern projection panel with reference to the pattern projection lens are thus adjusted, the pattern of the pattern projection panel can be sharply and precisely projected on the surface of the object to be measured.

Incidentally, though it does not matter what the structure of the adjusting mechanism should be, but it is preferable to constitute the adjusting mechanism with a slide plate arranged at right angles to the optical axis of light from the illuminator, and being slidable for positioning toward directions crossing at right angles with each other, a rotating plate provided on the slide plate in a rotatable manner around the axis parallel to the optical axis of light from the illuminator, a holder provided on the rotating plate holding the pattern projection panel, a plurality of setscrews which is set into the holder at intervals of designated angles and heads thereof are touched on the rotating plate, and a plurality of draw screws set on the rotating plate and between the setscrews.

The pattern projection panel is preferably formed of a liquid crystal panel of which pattern display is controlled by a passage of electric current. For instance, a pattern is displayed under the passage of electric current and is erased in the absence of electric current.

The pattern on the pattern projection panel is thus easily extinguished in a case of conventional usage of the apparatus for measurement of an object of a high contrast material.

For the patterns arranged on the liquid crystal panel, it is preferable to use a triangular pattern in which a set of two triangles having a different transparency are alternately aligned in right and left directions and the vertexes of the two triangles also alternately point upward and downward. The set of the triangle patterns being also vertically spread so that all vertexes of the adjacent triangles are positioned in the opposite direction. Another preferable pattern is a pattern of squares in which a set of two tilted squares of a different transparency are aligned alternately along the tilted edge lines intersecting each other at right angles. Or a pattern of wave shapes in which a set of two wave-shaped strips having different transparency are alternately arranged.

These patterns are useful to obtain correct focus because any object to be measured having a directional edge is easily visible, in other words, the edge can not be concealed behind the pattern.

A CCD camera is preferable for the optical observation system.

Further, it is preferable for the drive mechanism to be formed with a magnet provided on one side of both the box and a lens holder holding the object lens in a movable manner toward the optical axis, and a coil provided on the other side of the box and the lens holder.

BRIEF DESCRIPTION OF THE DRAWINGS

FIG. 11 is a plane view of yet another example of a liquid crystal panel;

FIG. 12 is a plane view of further another example of a liquid crystal panel;

FIGS. 13(A)–(B) is a plane view of a liquid crystal panel having a grid pattern.

DETAILED DESCRIPTION OF THE PREFERRED EMBODIMENT(S)

Figure 1:
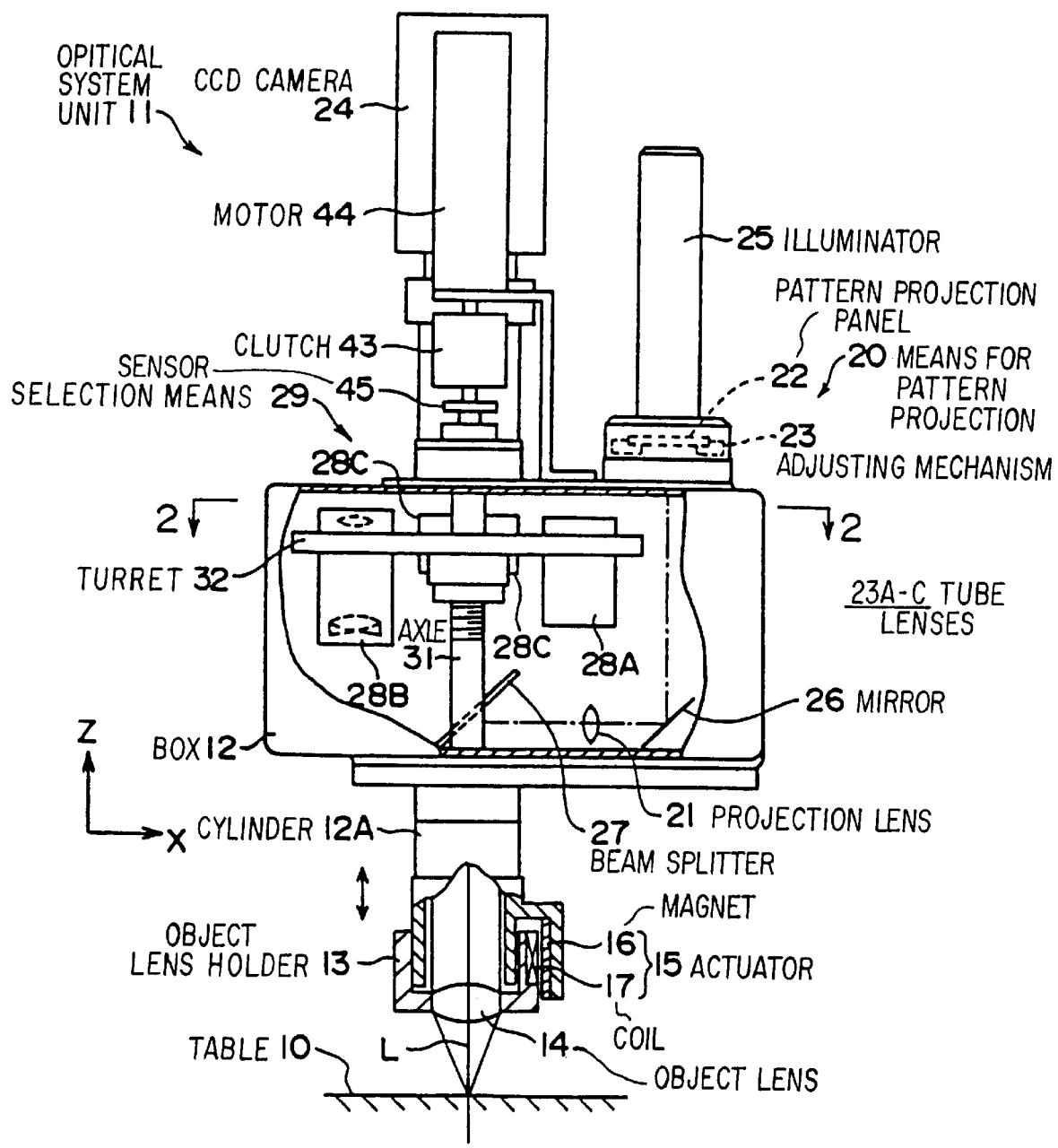
FIG. 1 is a side elevational view of an image measuring instrument relating to an embodiment of the present invention.

Here is a detailed explanation of an embodiment of the present invention referring to the drawings.

Figure 2:
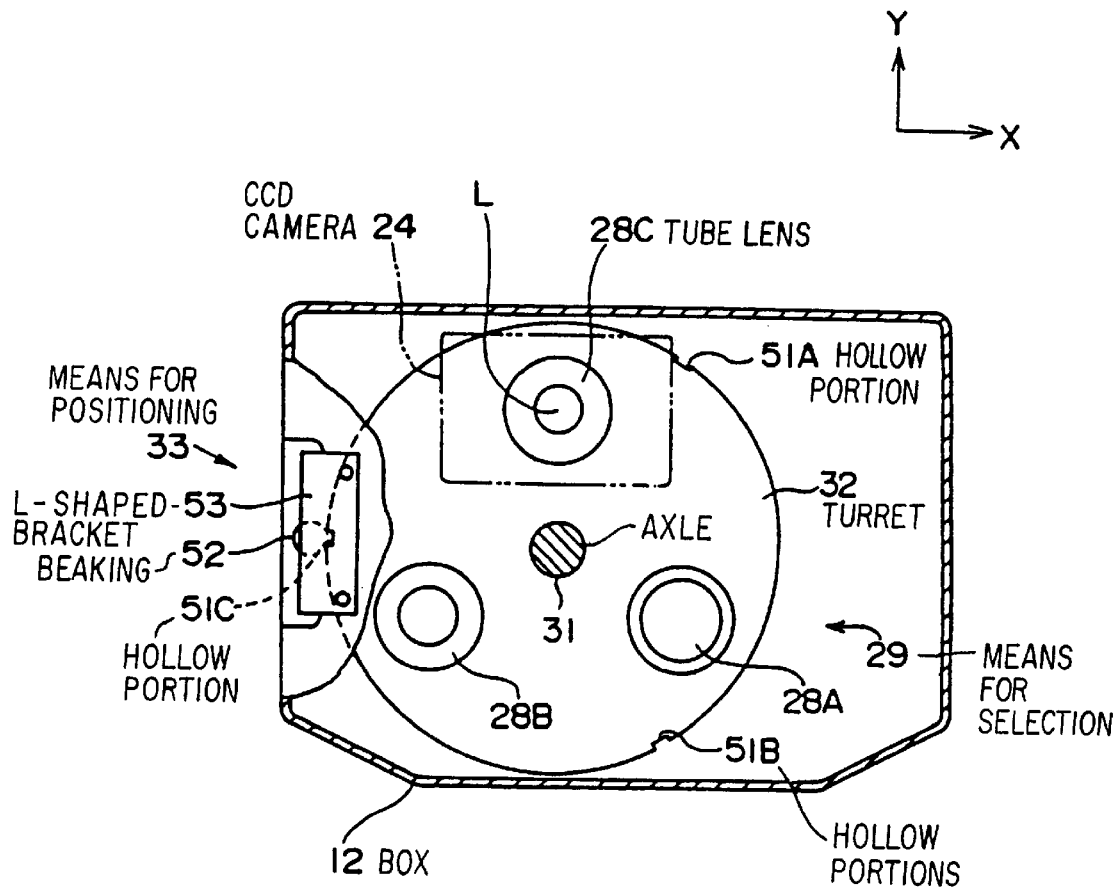
FIG. 2 is a sectional view taken along the 2—2 line in FIG. 1.

FIG. 1 is a side elevational view of an image measuring instrument relating to the embodiment, and FIG. 2 is a sectional view taken along the 2—2 line in FIG. 1. The image measuring instrument is defined by a table 10 which is provided in a movable manner toward the X- and the Y-axis directions (right and left directions in FIG. 1 and a direction perpendicular to the paper surface of FIG. 1) and is for putting an object to be measured, and on the opposite side of table 10 an optical system unit 11 which is able to move up and down toward the Z-axis (the vertical direction in FIG. 1) through a column not shown in a figure.

The optical system unit 11 has a box 12. In a cylinder 12A on the bottom surface of box 12, an object lens 14 is provided and held by an object lens holder 13 which can be displaced toward the optical axis L. An actuator 15 is provided as a drive mechanism to remove the object lens holder 13 toward an optical axis L between the cylindrical member 12A and the object lens holder 13. The actuator 15 is defined by a magnet 16 fixed at the cylindrical member 12A and a coil 17 fixed at the object lens holder 13. A CCD camera 24 and an illuminator 25 are mounted on the upper surface of the box 12. The CCD camera 24 is arranged on the optical axis of the object lens 14 and configures of an optical observation system which can observe an image of the object to be measured formed by the emitted light from the object lens 14.

In the box 12, a mirror 26 which reflects emitted light from the illuminator 25 toward the optical axis L at right angles, a beam splitter 27 which reflects the reflected light by the mirror 26 on the optical axis L, tube lenses 28A, 28B, 28C having different magnifications (for instance, 1 X, 2 X, 6 X), a means for selection 29 which can selectively replace any one of the tube lenses among 28A to 28C on the optical axis L and a means for pattern projection 20 which projects a designated pattern on the surface of the object to be measured.

The means for selection 29 is defined including a turret 32 which is provided in a rotatable manner around an axle 31 and is parallel to, but different from the optical axis L, having the tube lenses from 28A to 28C at intervals of an equal angle (an interval of 120 degrees) on the circumference of a circle at a radius of a distance from the axle 31 to the optical axis L, a means for positioning 33 which positions the turret 32 at each angle matching each tube lens 28A to 28C with the optical axis L, and a turret drive motor 44 which is connected to the axle 31 of the turret 32 through a clutch 43. Incidentally the designation 45 is a sensor detecting turning angles of the turret 32.

Figure 3:
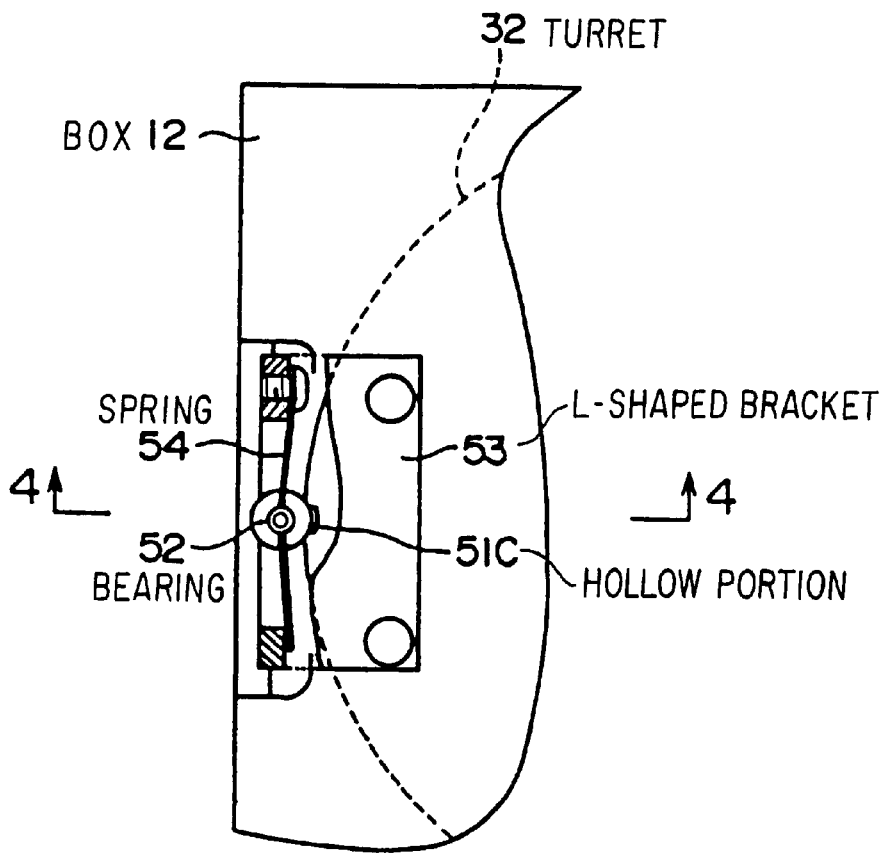
FIG. 3 is an enlarged view showing a means for positioning in the above embodiment.
Figure 4:
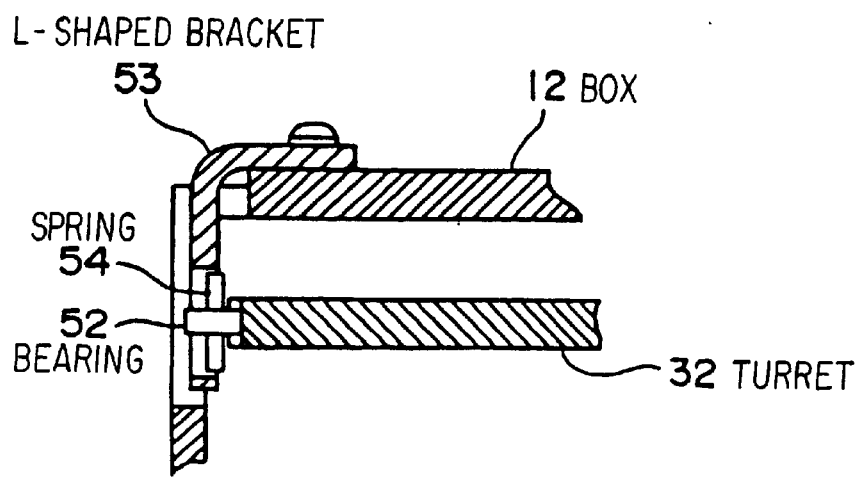
FIG. 4 is a sectional view taken along the 4—4 line in FIG. 3.

The means for positioning 33 provides three hollow portions 51A, 51B, 51C notched on the surface around the perimeter of the turret 32 at intervals of 120 degrees and a bearing 52 which is always biased to touch on the surface of the outer periphery of the turret 32 so that the bearing 52 can engage in the hollow portions 51A to 51C. The bearing 52 is supported by a L-shaped bracket 53 fixed on the upper surface of the box 12 through an open-sided flat spring as shown in FIG. 3 and FIG. 4.

The means for pattern projection 20 is defined by the illuminator 25, the projection lens 21 provided between the mirror 26 and the beam splitter 27, the pattern projection panel 22 inserted between the illuminator 25 and the mirror 26 (conjugated position with an object surface of the illuminator 25) and formed a designated pattern, and the adjusting mechanism 23 for adjusting the distance and inclination of the pattern projection panel 22 to the projection lens 21.

Figure 5A:
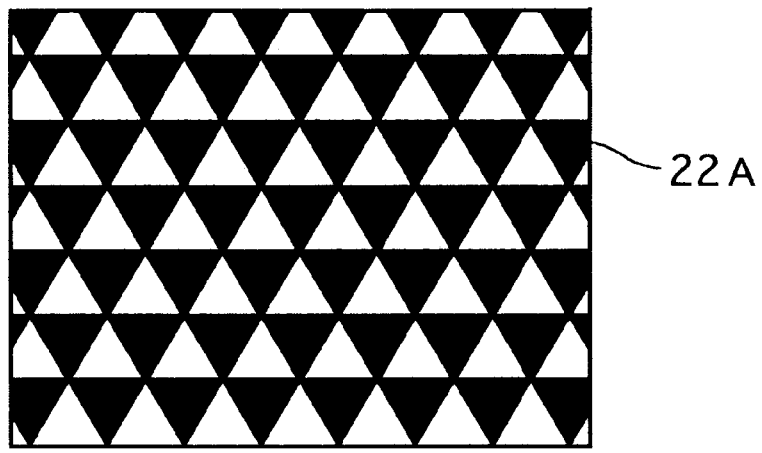
FIGS. 5(A)–(B) is a plane view of a liquid crystal panel in the above embodiment and a schematic view of a surface of an object to be measured on which the pattern of the liquid crystal panel is projected.
Figure 5B:
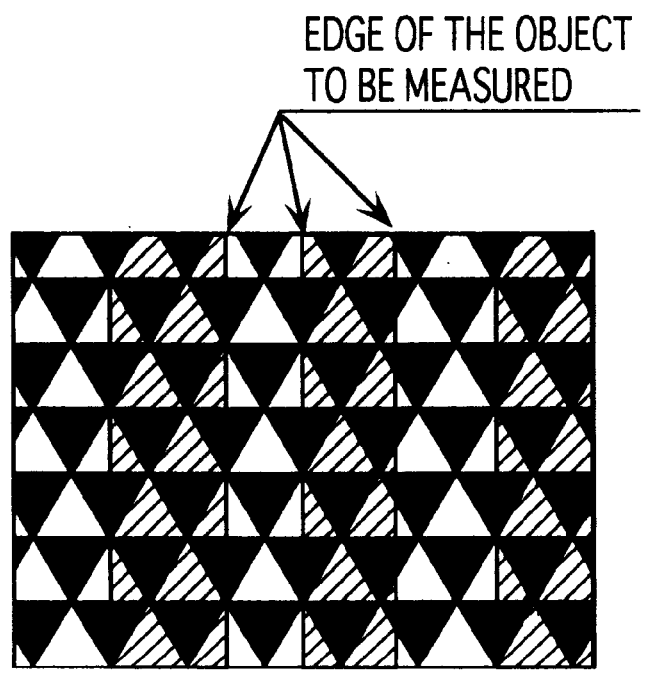
Figure 6:
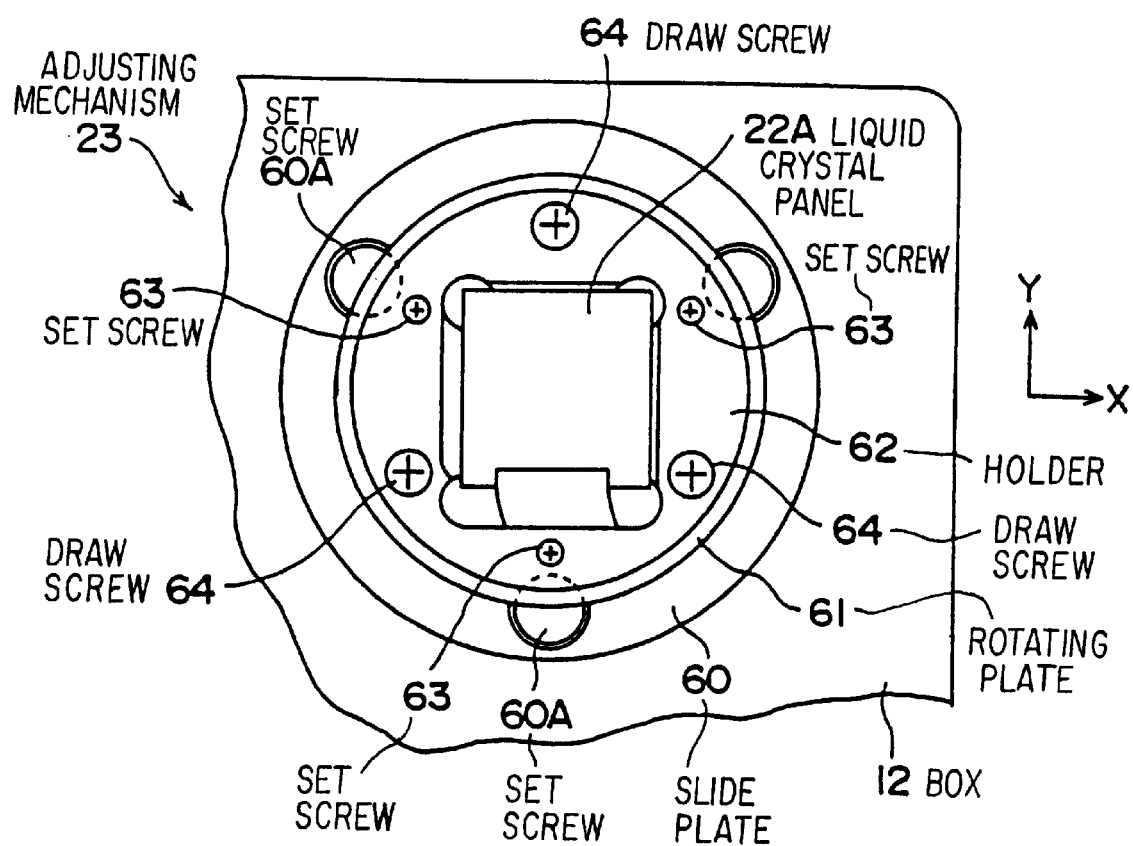
FIG. 6 is a plane view of an adjusting mechanism in the above embodiment.
Figure 7:
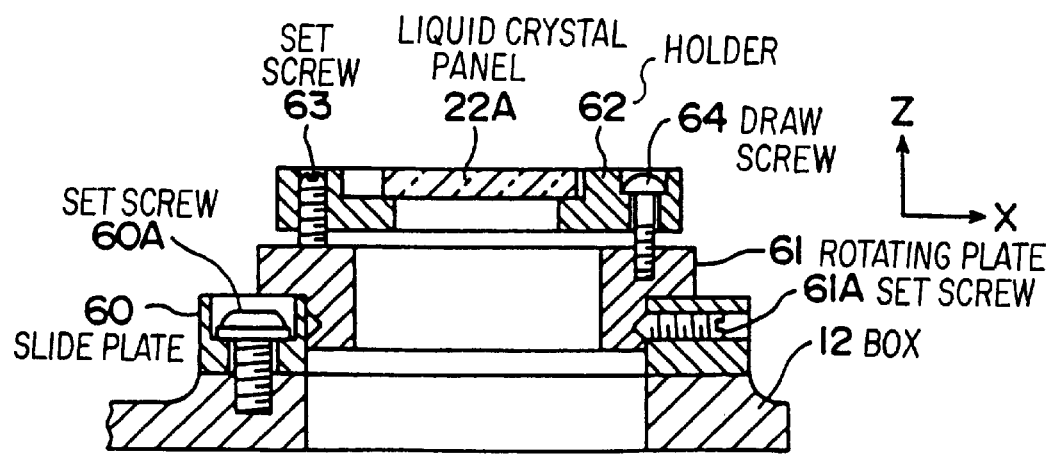
FIG. 7 is a sectional view of the adjusting mechanism in the above embodiment.

The pattern projection panel 22 is defined by a liquid crystal panel 22A which displays a pattern of triangles using a passage of electric current as shown in FIG. 5(A). The triangle pattern is a pattern arranging two triangles having a different light absorption rate, more specifically, two regular triangles one having light transparency and the other having no transparency are alternately placed in right and left directions (the X-axis direction) and in the reverse direction for the vertex of the triangle and concurrently the triangles are vertically placed (the Y-axis direction) in the same way.

The adjusting mechanism 23 is defined by a slide plate 60 provided in a slidable manner toward the X-axis and the Y-axis for positioning in the box 12 and fixed with setscrews 60A, a rotating plate 61 provided in a rotatable manner around the Z-axis on the slide plate 60 and fixed with a set-screw 61A at any optional position of angles, a holder 62 provided on the rotating plate 61 and holds the liquid crystal panel 22A, three setscrews 63 set on the holder 62 at intervals of 120 degrees and heads of the set-screws are touched on the rotating plate 61, and three draw screws 64 set on the rotating plate 61 between the three setscrews. It is possible therefore to adjust the position, of the liquid crystal panel 22 on the X- and Y-axis directions by adjusting the position of slide plate 60, angles (angles around the Z-axis) of the liquid crystal panel 22A by rotation of the rotating plate 61, the distance and inclination of the liquid crystal plate 22A to the projection lens 21 by adjusting the set-screws 63 and the draw screws 64.

Figure 8:
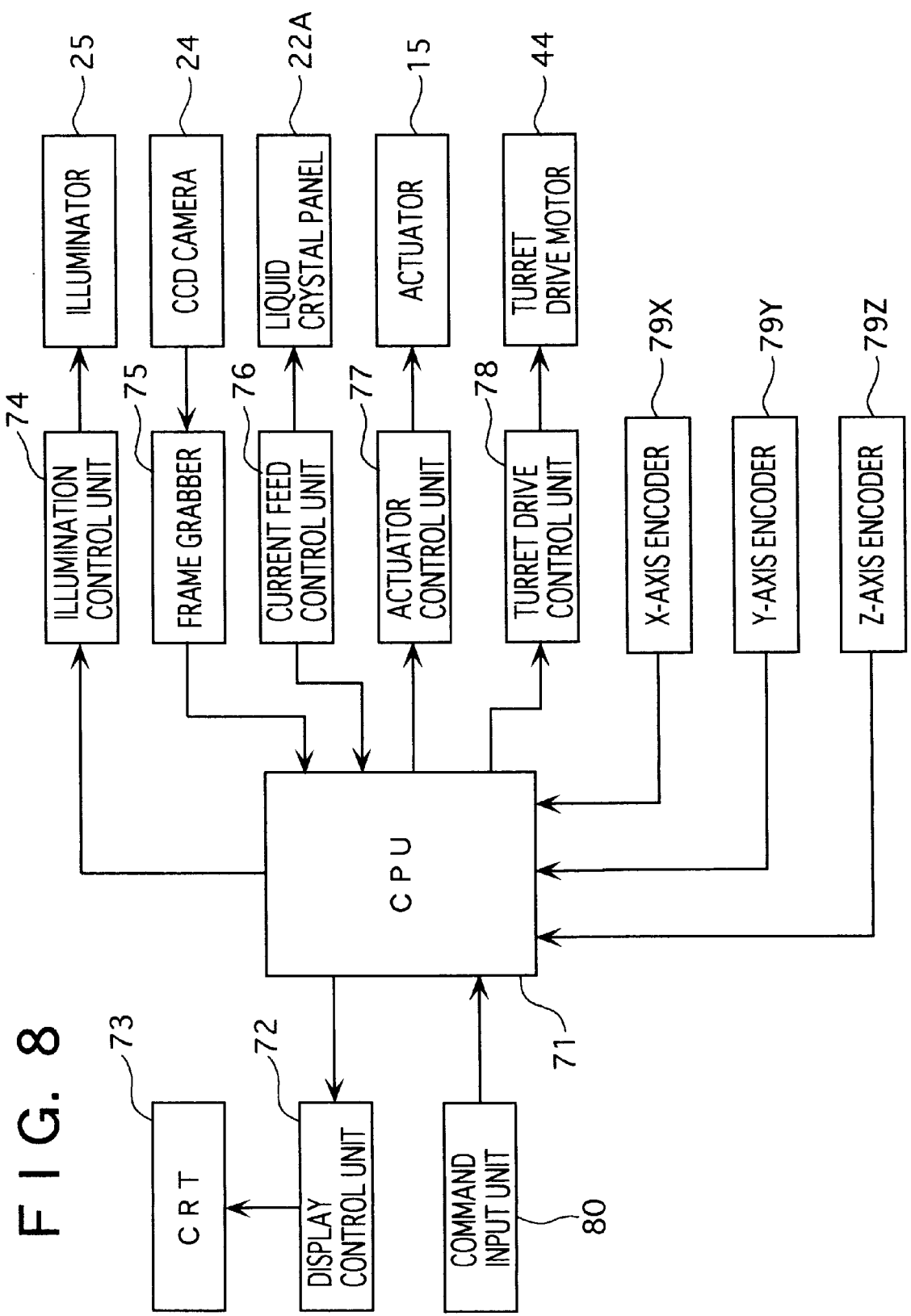
FIG. 8 is a block diagram of a control system in the above embodiment.

FIG. 8 is a block diagram showing a control device of an image measuring instrument relating to the present embodiment. The control device is provided with a CPU 71. A CRT 73 through a display control unit 72, the illuminator 25 through an illumination control unit 74, the CCD camera 24 through a frame grabber 75, the liquid crystal panel 22A through a current feed control unit 76, the actuator 15 through an actuator control unit 77, and the turret drive motor 44 through a turret drive control unit 78, are connected to the CPU 71, respectively. And the X-axis encoder 79X to detect a position of the table 10 on the X-axis, the Y-axis encoder 79Y to detect the position of the table 10 on the Y-axis, the Z-axis encoder 79Z to detect the position of the optical system unit 11 (the object lens 14) on the Z-axis and a command input unit 80 are connected to the CPU 71, respectively.

When starting a measurement with the above structure, any one of the tube lenses 28A to 28C is positioned on the optical axis L. The motor 44 is turned to designated angles while the clutch 43 is linked, and stopped. Then any one of the tube lenses 28A to 28C reaches near the optical axis L by the turning of motor 44 and the bearing 52 begins to fit in some corresponding hollow portion 51A to 51C. By releasing the clutch 43 at the moment, the motor 44 is detached from the turret 32, in other words, rotational resistance of the motor 44 is disappeared, then the turret 32 is automatically turned till the position of angles where any one of 51A to 51C is fully fitted to the bearing 52 and thus positioned.

When light is emitted from the illuminator 25 at this moment, the light is reflected by the mirror 26, reflected again by the beam splitter 27 and irradiates on an object on the table 20 through the object lens 14. The reflected light from the object passes through the object lens 14, is zoomed in or out in accordance with a power of the selected tube lens 28A to 28C and the beam splitter 27, and then the image is formed on the CCD camera.

Here the CPU 71 detects contrast value of each pixel taken by the CCD camera, feeds electric current to the liquid crystal panel 22A through the current feed control unit in a case that the contrast value is below a predetermined value. A pattern of triangles shown in FIG. 5(A) is displayed on the current fed liquid crystal panel 22A and the pattern of the triangles is focused on the surface of the object to be measured through the projection lens 21. Then the CPU 71 drives the actuator 15 based on the contrast value of each pixel taken by the CCD camera 24 through the actuator control unit 77 and displaces the object lens 14 toward the optical axis L to obtain correct focus, in other words, displaces the object lens 14 at the position of the maximum contrast value of the pixel. At the moment, an end of the object to be measured is left unconcealed so that a correct focus is obtained.

Sizes and shapes of the object are measured from the image of the object to be measured taken by the CCD camera 24 in the above described condition.

According to the present embodiment, as the means for pattern projection 20 for projecting a pattern on a surface of object to be measured, is provided, the pattern can be projected on the surface of object. And the object lens 14 can be displaced toward the optical axis L in accordance With the contrast of the pattern so that the light is gathered on the surface of the object. It is possible, therefore, to focus on an originally low contrast material such as a mirror-finished surface or a glass surface. As the method of the present invention belongs to a contrast method, the difficulty in the laser focus method can not be contained.

As the means for pattern projection 20 is defined by the illuminator 25, the projection lens 21, the pattern projection panel 22 having a projected designated pattern and inserted between the illuminator 25 and the projection lens 21, and the adjusting mechanism 23 for adjusting the distance and inclination of the pattern projection panel 22 to the projection lens 21, the pattern on the pattern projection panel 22 can be sharply and precisely focused on a surface of object to be measured.

And as the pattern projection panel is formed of the liquid crystal panel 22A which displays a pattern by means of passing electric current, the apparatus of the present invention can be used as the apparatus for a conventional contrast method, just by eliminating the pattern on the liquid crystal panel, for measuring an object consisting of a high contrast material. Thus the substitution for a conventional contrast method can be easily accomplished.

A pattern of triangles being displayed on the liquid crystal panel 22A during the passage of electric current, it is possible to obtain correct focus even the end of object to be measured is directional, since the end remains unconcealed. Incidentally, as shown in FIG. 13(A), with a liquid crystal panel 22F on which a slit-like shaped pattern is displayed, the slits may be overlapped with an end of object to be measured in a case of the same direction as shown in FIG. 13(B) and the needed end for focusing may be concealed.

As the apparatus is defined by the turret 32 having three tube lens 28A to 28C with different powers arranged on the circumference in a rotatable manner between the object lens 14 and the CCD camera 24, and a means for selection 29 to select any one of the tube lenses 28A to 28C including the turret 32 onto the optical axis L, when compared with the object lens turret type, the apparatus is not expensive because of no need for a plurality of object lenses and an illumination set in outside such as a ring illumination can be applied.

The means for selection 29 is defined by including the turret 32 provided in a rotatable manner around the axle 31 which is parallel to the optical axis L of the object lens 14 but at a different position and having tube lenses 28A to 28C on the circumference of a circle of which radius is the distance from the axle 31 to the optical axis L of the object lens, and the means for positioning 33 to position the turret 32 to the positions of angles where each tube lens 28A to 28C matches with the optical axis L of the object lens 14. The turret 32 can be positioned by the means for positioning 33 to the position of angles where each tube lens 28A to 28C matches with the optical axis L of the object lens 14 on turning the turret 32, it becomes thus easy to match each tube lens 28A to 28C with the optical axis L of the object lens 14.

As the motor 44 is connected to the axle 31 of the turret 32 through the clutch 43, the turret 32 can be automatically turned to the designated position of angles. When the turret 32 arrives at the designated position of angles, the motor 44 is detached by releasing the clutch 43 from the turret 32 so that rotational resistance of the motor 44 is disappeared and the positioning of the turret 32 can be exactly positioned at the designated position of angles by the means for positioning 33.

The means for positioning 33 is defined by including the hollow portions 51A to 51C notched on the surface around the perimeter of the turret 32, the bearing 52, and the flat spring 54 which always biases the bearing 52 to touch on the surface of the outer periphery of the turret 32. When the turret 32 is reached to a designated position of angles, that is, when any one of the hollow portion 51A to 51C starts to fit the bearing, the motor 44 is detached from the turret 32 by releasing the clutch 43, then the turret 32 independently begins to turn. Thus the turret 32 can be precisely positioned with such a simple configuration.

In the above described embodiment, the pattern projection panel 22 is the liquid crystal plate 22A on which the pattern of triangles is displayed in a passage of electric current, but liquid crystal panels of other patterns can be included in the scope of the present invention, not limited to the pattern of triangles.

Figure 9:
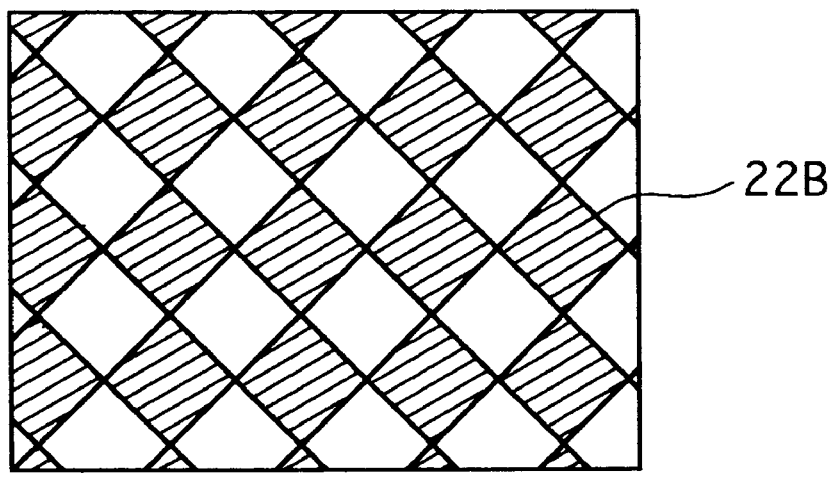
FIG. 9 is a plane view of another example of a liquid crystal panel.

For instance as shown in FIG. 9, a liquid crystal panel 22B having a pattern of squares in a passage of electric current is also included. The pattern in the liquid crystal panel 22B is a sequence of a set of squares which consists of two tilted squares having different transparency. More specifically, one having transparency and the other having no transparency are alternately arranged in inclined way and along the tilted edge lines intersecting each other at right angles.

Figure 10:
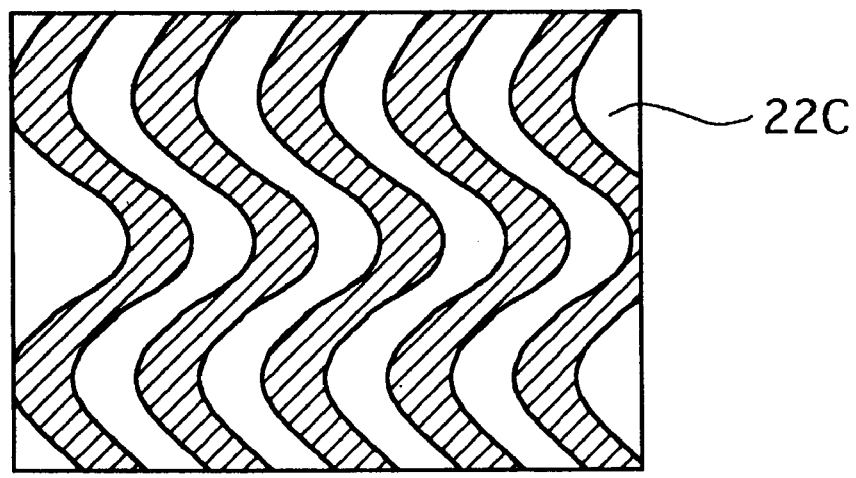
FIG. 10 is a plane view of still another example of a liquid crystal panel.

Liquid crystal panels 22C, 22D, 22E which have waving patterns in a passage of electric current are also in the scope of the present invention, as shown in FIG. 10, FIG. 11, and FIG. 12. These are a sequence of a set of two wave-shaped belts having different transparency, more specifically, one having transparency and the other having no transparency, alternately arranged along the horizontal direction, vertical direction, or farther along a slant direction.

Figure 14:
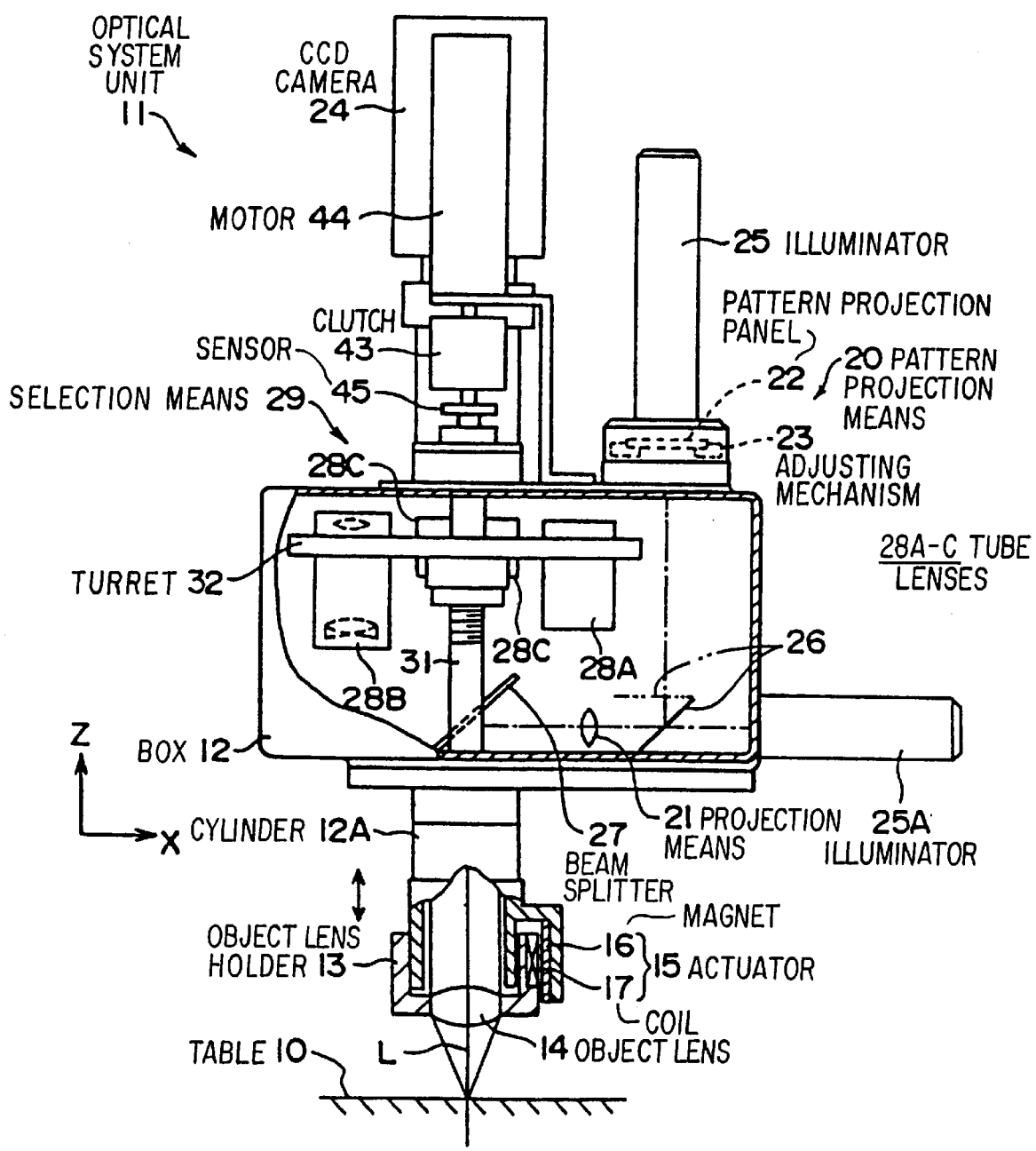
FIG. 14 is a side elevational view of an image measuring instrument relating another embodiment of the present invention.

It is also possible to project patterns by selecting any one from the illuminator 25 or an illuminator 25A when the illuminator 25A other than the illuminator 25 of the means of pattern projection 20 is provided at the opposite side of the projection lens 21 putting the mirror 26 in-between and the mirror 26 is arranged in an undulatable manner as shown in FIG. 14.

As for the pattern projection panel 22, it is not limited to the liquid crystal panels 22A to 22F, but a panel such as a reticle on which a designated pattern is drawn is also in the scope of the present invention. In such a case, the panel may be made in a detachable manner and is detached when measuring a high contrast object.

The adjusting mechanism 23 is also not limited within the structure above described. For instance, the number of the set-screws 63 or draw screws 64 is optional.

And as for the actuator 15, conversely from the structure above described, the coil 17 may be provided on the cylinder portion 12A side and the magnet 16 may be provided on the object lens holder 13 side.

The auto-focus apparatus according to the present invention makes it possible to focus on the objects to be measured made of all sorts of materials without any limitation by the quality of the material and at any position within the observation image of the object.

What is claimed is:

1. An auto-focus apparatus having an object lens to condense light on a surface of an object to be measured, an optical observation system observing the object's image produced by emitting light from the object lens, a drive mechanism for the object lens to displace along an optic axis thereof based on a contrast of the object's image derived by the optical observation system, and a pattern projection means to project a designated pattern onto the surface of said object to be measured, wherein;

said pattern projection means comprises a liquid crystal panel onto which said designated pattern is controlled to be displayed when charged with electricity, wherein the designated pattern is based on a contrast value of at least a portion of the surface of said object to be measured.

2. The auto-focus apparatus according to claim 1, wherein said pattern projection means includes an illuminator, a projection lens, and a pattern projection panel which is inserted between said illuminator and said projection lens and has at least one designated pattern.

3. The auto-focus apparatus according to claim 1, wherein said designated pattern displayed on said liquid crystal panel is a pattern of triangles in which the triangles are arranged in a manner that every two triangles of different transparency are placed right and left, up and down, alternately turning upside down with each other so that all vertexes of the adjacent triangles are positioned in the opposite direction.

4. The auto-focus apparatus according to claim 1, wherein said designated pattern displayed on said liquid crystal panel is a pattern of squares in which the squares are arranged in a manner that every two squares of different transparency are alternately aligned in a slanting direction and also along the straight lines intersecting with the ridge lines of the squares at right angles.

5. The auto-focus apparatus according to claim 1, wherein said designated pattern displayed on said liquid crystal panel is a pattern of belt form wave shapes in which the wave shapes are arranged in a manner that every two belt form wave shapes of different transparency are alternately placed side by side.

6. The auto-focus apparatus according to claim 1, wherein said pattern projection means includes an illuminator, a projection lens, said liquid crystal panel which is inserted between said illuminator and said projection lens, and an adjusting mechanism to adjust the distance and inclination of said liquid crystal panel with reference to said projection lens.

7. The auto-focus apparatus according to claim 6, wherein said adjusting mechanism is formed with a slide plate arranged at right angles to an optical axis of light from said illuminator, and being slidable for positioning toward directions crossing at right angles with each other, a rotating plate provided on said slide plate in rotatable manner around an axis parallel to the optical axis of light from said illuminator, a holder provided on the rotating plate holding said pattern projection panel, a plurality of setscrews which are set into the holder at intervals of a designated angle and heads thereof are touched on said rotating plate, and a plurality of draw screws set on said rotating plate and between the setscrews.

8. The auto-focus apparatus according to claim 7, wherein said optical observation system comprises a CCD camera.

9. The auto-focus apparatus according to claim 8, wherein said drive mechanism is formed with a met provided on one side of said box and a lens holder holding said object lens in a movable manner along said optical axis, and a coil provided on the other side of the box and the lens holder.

10. The auto-focus apparatus according to claim 1, wherein said designated pattern has a contour facing at least two different directions.

* * * * *